(12) United States Patent
Golub et al.

(10) Patent No.: US 7,835,948 B2
(45) Date of Patent: Nov. 16, 2010

(54) FLORAL NETWORK METHODS AND SYSTEMS FOR PROCESSING FLORAL ARRANGEMENTS

(75) Inventors: Jerel T. Golub, Niskayuna, NY (US); Raymond J. Strom, Copake Falls, NY (US)

(73) Assignee: The Golub Corporation, Schenectady, NY (US)

( * ) Notice: Subject to any disclaimer, the term of this patent is extended or adjusted under 35 U.S.C. 154(b) by 1105 days.

(21) Appl. No.: 11/470,778

(22) Filed: Sep. 7, 2006

(65) Prior Publication Data

US 2008/0065499 A1 Mar. 13, 2008

(51) Int. Cl.
*G06Q 30/00* (2006.01)
(52) U.S. Cl. .......................................... 705/26; 705/27
(58) Field of Classification Search ................... 705/26, 705/27
See application file for complete search history.

(56) References Cited

U.S. PATENT DOCUMENTS

| | | | | |
|---|---|---|---|---|
| 4,873,643 A | 10/1989 | Powell et al. | ............... | 364/468 |
| 5,251,251 A | 10/1993 | Barber et al. | ................. | 379/67 |
| 5,425,078 A | 6/1995 | Stern | ........................... | 379/67 |
| 5,440,479 A | 8/1995 | Hutton | ....................... | 364/401 |
| 5,442,567 A | 8/1995 | Small | ........................ | 364/479 |
| 5,444,767 A | 8/1995 | Goetcheus et al. | ............ | 379/67 |
| 5,513,117 A | 4/1996 | Small | ......................... | 364/479 |
| 5,658,621 A * | 8/1997 | Sohn | ........................... | 428/24 |
| 5,845,265 A | 12/1998 | Woolston | ..................... | 705/37 |
| 5,864,604 A | 1/1999 | Moen et al. | ................... | 379/88 |
| 5,870,718 A | 2/1999 | Spector | ....................... | 705/26 |
| 5,917,925 A | 6/1999 | Moore | ........................ | 382/101 |
| 5,971,273 A | 10/1999 | Vallaire | ....................... | 235/381 |
| 5,983,200 A * | 11/1999 | Slotznick | ..................... | 705/26 |
| 5,983,201 A | 11/1999 | Fay | .............................. | 705/27 |
| 5,992,753 A | 11/1999 | Xu | ......................... | 235/472.01 |
| 6,011,833 A | 1/2000 | West | ....................... | 379/88.25 |

(Continued)

FOREIGN PATENT DOCUMENTS

WO WO 96/41310 12/1996

(Continued)

OTHER PUBLICATIONS

Smith, Mark; "Approved on-site," Printing Impressions, Apr. 2001, v43n11pp. 44-51; Dialog file 15 #02155886, 6pgs.*

(Continued)

*Primary Examiner*—Robert M. Pond
(74) *Attorney, Agent, or Firm*—Heslin Rothenberg Farley & Mesiti P.C.

(57) ABSTRACT

A floral network system and method allows for collecting, storing and retrieving data regarding the processing of personalized or custom floral arrangements linked to personal accounts for a plurality of customers. For example, a floral network method and system may store one or more close-up or detailed images of a personalized or custom-made floral arrangement for a customer along with data regarding the order, the customer, and a recipient. The next time that the customer places an order, the close-up or detailed images and data on past orders can be retrieved and viewed by the customer and used by the florist in the preparing a subsequent floral arrangement. Reminders may also be sent to the customers for important events where floral arrangements may be desired.

35 Claims, 6 Drawing Sheets

U.S. PATENT DOCUMENTS

| | | | |
|---|---|---|---|
| 6,047,265 A | 4/2000 | Sugimori | 705/26 |
| 6,323,782 B1 | 11/2001 | Stephens et al. | 340/10.31 |
| 6,381,510 B1 | 4/2002 | Amidhozour et al. | 700/130 |
| 2001/0023410 A1 | 9/2001 | Hayes et al. | 705/26 |
| 2001/0056377 A1 | 12/2001 | Kondoh et al. | 705/26 |
| 2002/0007321 A1 | 1/2002 | Burton | 705/26 |
| 2002/0038258 A1 | 3/2002 | Inoue et al. | 705/26 |
| 2002/0040333 A1 | 4/2002 | Fuwa | 705/27 |
| 2002/0052803 A1 | 5/2002 | Amidhozour et al. | 705/27 |
| 2002/0055878 A1 | 5/2002 | Burton et al. | 705/26 |
| 2002/0062260 A1 | 5/2002 | Inoue et al. | 705/26 |
| 2002/0069124 A1 | 6/2002 | Hayes et al. | 705/26 |
| 2002/0082853 A1* | 6/2002 | Goodwin | 705/1 |
| 2002/0103714 A1 | 8/2002 | Eze | 705/26 |
| 2007/0079549 A1 | 4/2007 | Dillon et al. | 47/41.01 |

FOREIGN PATENT DOCUMENTS

| | | |
|---|---|---|
| WO | WO 2008/030989 | 3/2008 |

OTHER PUBLICATIONS

Macnicol, Kirsty; "Is your cyber convenient," The Southland Times, Feb. 14, 2003, Proquest #290011091, 3pgs.*
Golub, et al., PCT International Patent Application, Search Report, 2 pages, Oct. 23, 2008.
Golub, et al., PCT International Patent Application, Written Opinion, 5 pages, Oct. 23, 2008.
"Flowers to Saint Petersburg" http://www.flowerstopetersburg.com, 5 pages, 2005.
Calimag, Melvin G., "Philippines- Portal Plans to Boost E-Shopping." Newsbytes news Network, Oct. 6, 2000.
"Happy Birthday: The New Way to Say "Happy Birthday" Is Not in the Cards Anymore," Business Wire, Nov. 8, 1989.
Miller, Paul, "USPS Readies Confirmation System," Catalog Age, v15n5, pp. 5, Apr. 15, 1998.
Miller, Paul, "The Future of Parcel Shipping," Catalog Age, v15n7, pp. 163-164, Jun. 1998.
"Internet Wine Gift Company Offers Answer to Recent Legislation." PR Newswire, Aug. 10, 1999.

* cited by examiner

FLORAL NETWORK METHODS AND SYSTEMS FOR PROCESSING FLORAL ARRANGEMENTS

FIELD OF THE INVENTION

This invention relates to computerized methods and systems for processing floral arrangements, and in particular, to collecting, storing, and retrieving data regarding personalized floral arrangements linked to customers' personal accounts.

BACKGROUND OF THE INVENTION

Typically, florists are independently owned and operated and serve local communities by providing timely fresh arrangements, plants and related gifts for a variety of occasions. Wire services provide networks for these independent florists and facilitate the transfer of orders, allowing for delivery of fresh flowers around the world. Consumers are often presented with descriptions or photographs of possible floral arrangements from which to select.

Various attempts have been made to automate the processing of floral arrangements for customers. For example, U.S. Patent Application Publication No. 2002/0082853 by Goodwin discloses a photo delivery service system which includes delivering a digital image of a recipient receiving a gift to the sender of the gift. When placing an order online, by phone or at a storefront, the sender gives the merchant the sender's email address or postal address. The sender places an order with a delivery address and a delivery person with a digital camera delivers the gifts. When the gift is handed to the receiver, the delivery person captures at least one digital image with the camera of the gift and the person. The image can also be a video and audio clip from a digital camcorder. The receiver can also attach a short message of thanks to the image. The image is then sent to the sender. A server database holds a library of delivered flowers, gifts or other goods, and can be referenced for future orders. For example, if a customer comes back to a merchant flower store in a few months and asks for the same arrangement they previously ordered, the merchant can use the customer's stored image to reproduce a similar flower arrangement.

U.S. Patent Application Publication Nos. 2002/0007321 and 2002/0055878 by Burton disclose systems and methods for ordering flower arrangements. For example, the system may display a vase that allows the user to fill in flowers one stem or stalk at a time. In addition, a display may include a content area that displays information about user orders such as current, future, or past orders. The system may also provide a display for record keeping purposes. In this regard, the display may be used to show order history, accounting data, or any information relevant to users when accessing accounts.

U.S. Pat. No. 5,440,479 issued to Hutton discloses a floral kiosk system which interacts with a floral ordering network and which allows users to either select a particular floral arrangement or create a floral arrangement from an assortment of flowers, flower configurations, and flower holders. In one embodiment, the method includes storing predefined floral data in a database of a user station (the floral data including a plurality of flowers, a plurality of flower configurations, and a plurality of flower holders), retrieving the floral data from the database and displaying the retrieved floral data on display means integrally associated with the user station. A customer then selects floral data displayed on the display means so that at least one of the plurality of flowers, at least one of the flower configurations, and at least one of the flower holders are selected to create the floral arrangement. To complete the purchase, the created arrangement is ordered from the user station utilizing an integral network interface which is operatively connected to a remote floral network.

There is a need for further methods and systems for collecting, storing, and retrieving data regarding personalized floral arrangements linked to a customers' personal accounts.

SUMMARY OF THE INVENTION

The present invention provides, in a first aspect, a computerized method for use in processing a plurality of floral arrangements for a customer. The computerized method includes obtaining at least one detailed image of an actual prepared floral arrangement for the customer prior to delivery of the actual prepared floral arrangement, obtaining data describing at least the number of and type of the flowers forming the actual prepared floral arrangement, obtaining data regarding the customer, storing and associating the at least one detailed image of the actual prepared floral arrangement, the data describing at least the number of and type of the flowers forming the actual prepared floral arrangement, and the data regarding the customer in at least one data storage unit, retrieving the at least one stored detailed image of the actual prepared floral arrangement for the customer from the at least one data storage unit, and displaying the at least one stored detailed image for the customer for use in purchasing another floral arrangement.

The present invention provides, in a second aspect, a system for use in processing a plurality of floral arrangements for a customer. The system includes a processor, at least one storage unit operably connected to the processor, and a display operably connected to the processor. The processor is operable to receive at least one detailed image of an actual prepared floral arrangement for a customer prior to delivery of the actual prepared floral arrangement, data describing at least the number of and type of the flowers forming the actual prepared floral arrangement, and the data regarding the customer. The processor is operable to store and associate the at least one detailed image of the actual prepared floral arrangement, the data describing the at least the number of and type of the flowers forming the actual prepared floral arrangement, and the data regarding the customer in the at least one storage unit. The processor is operable to retrieve the at least one stored detailed image from the at least one data storage unit for display on the display for use by the customer in purchasing another floral arrangement.

The present invention provides, in a third aspect, a computerized system for use in processing a plurality of floral arrangements for a customer. The computerized system includes means for obtaining at least one detailed image of an actual prepared floral arrangement for a customer prior to delivery of the actual prepared floral arrangement, means for obtaining data describing at least the number of and type of the flowers forming the actual prepared floral arrangement, means for obtaining data regarding the customer, means for storing and associating the at least one detailed image of the actual prepared floral arrangement, the data describing the at least the number of and type of the flowers forming the actual prepared floral arrangement, and the data regarding the customer in at least one data storage unit, means for retrieving the at least one stored detailed image from the means for storing, and means for displaying the at least one retrieved detailed image for use by the customer in purchasing another floral arrangement.

The present invention provides, in a fourth aspect, a computerized method for use in processing a plurality of floral arrangements for a plurality of customers. The method includes receiving a plurality of orders for floral arrangements for the plurality of customers via a communication network, forwarding the plurality of orders to a plurality of florists via the communication network, receiving, from the plurality of florists via the communication network, a plurality of detailed images of actual prepared floral arrangements based on the plurality of orders, and data describing the number of and type of flowers forming the actual prepared floral arrangements, storing and associating the plurality of detailed images of the actual prepared floral arrangements, the data describing the number of and type of flowers forming the actual prepared floral arrangements, and the data regarding the plurality of customers in at least one data storage unit, retrieving at least one stored detailed image of the actual prepared floral arrangement associated with at least one customer from the at least one data storage unit, and displaying the at least one stored detailed image for the at least one customer for use in purchasing another floral arrangement.

The present invention provides, in a fifth aspect, a system for processing a plurality of floral arrangements for a plurality of customers. The system includes a processor, at least one storage unit operably connected to said processor, and a display. The processor is operable to receive a plurality of orders for floral arrangements for the plurality of customers via a communication network, to forward the plurality of orders to a plurality of florists via the communication network, to receive from the plurality of florists via the communication network a plurality of detailed images of actual prepared floral arrangements based on the plurality of orders, data describing the number of and type of flowers forming the actual prepared floral arrangements, and data regarding the customers, to store and associate the plurality of detailed images of the actual prepared floral arrangements in a data storage unit, the data describing the number of and type of flowers forming the actual prepared floral arrangements, and the data regarding the customers in at least one data storage unit, to retrieve at least one stored detailed image of the actual prepared floral arrangement associated with at least one customer from the at least one data storage unit via the communication network, and to display the at least one stored detailed image on a display for the at least one customer for use in purchasing another floral arrangement.

The present invention provides, in a sixth aspect, a computerized method for use in processing a plurality of floral arrangements for a plurality of customers. The computerized method includes means for receiving a plurality of orders for floral arrangements for the plurality of customers via a communication network, means for forwarding the plurality of orders to a plurality of florists via the communication network, means for receiving, from the plurality of florists via the communication network, a plurality of detailed images of actual prepared floral arrangements based on the plurality of orders, and data describing the number of and type of flowers forming the actual prepared floral arrangements, means for storing and associating the plurality of detailed images of the actual prepared floral arrangements, the data describing the number of and type of flowers forming the actual prepared floral arrangements, and the data regarding the plurality of customers in at least one data storage unit via the communication network, means for retrieving at least one stored detailed image of the actual prepared floral arrangement associated with at least one customer from the at least one data storage unit via the communication network, and means for displaying the at least one stored detailed image for the at least one customer for use in purchasing another floral arrangement.

The present invention provides, in a seventh aspect, a method for warehousing information relating to processing a plurality of orders for floral arrangements for a plurality of customers. The method includes storing and associating a plurality of detailed images of the actual prepared floral arrangements, data describing the number of and type of flowers forming the actual prepared floral arrangements, and data regarding the customers in at least one data storage unit.

The present invention also provides computer products employing the above-described methods.

BRIEF DESCRIPTION OF THE DRAWINGS

The present matter which is regarded as the invention is particularly pointed out and distinctly claimed in the concluding portion of the specification. The present invention, however, may best be understood by reference to the following detailed description of various embodiments and the accompanying drawings in which:

DETAILED DESCRIPTION OF THE INVENTION

The present invention in one aspect is generally directed to floral network systems and methods for collecting, storing, and retrieving data regarding floral arrangements which may be personalized floral arrangements particular to the customers and linked to personal accounts for the customers. As described in greater detail below, a floral network system may store one or more close-up or detailed images of floral arrangements, e.g., standard, customized, or unique floral arrangements for customers, along with data regarding the order, the customer, and a recipient, prior to delivery of the floral arrangement. The next time that the customer desires to place an order for a subsequent floral arrangement, the close-up or detailed images and data on past orders can be retrieved and viewed by the customers and used by the florist for preparing a subsequent floral arrangement. The subsequent personalized floral arrangement can also be imaged and stored with data for further use in viewing by the customer and by the florist for preparing further floral arrangements. Reminders may also be sent to the customer for important events where floral arrangements may be desired.

Figure 1:
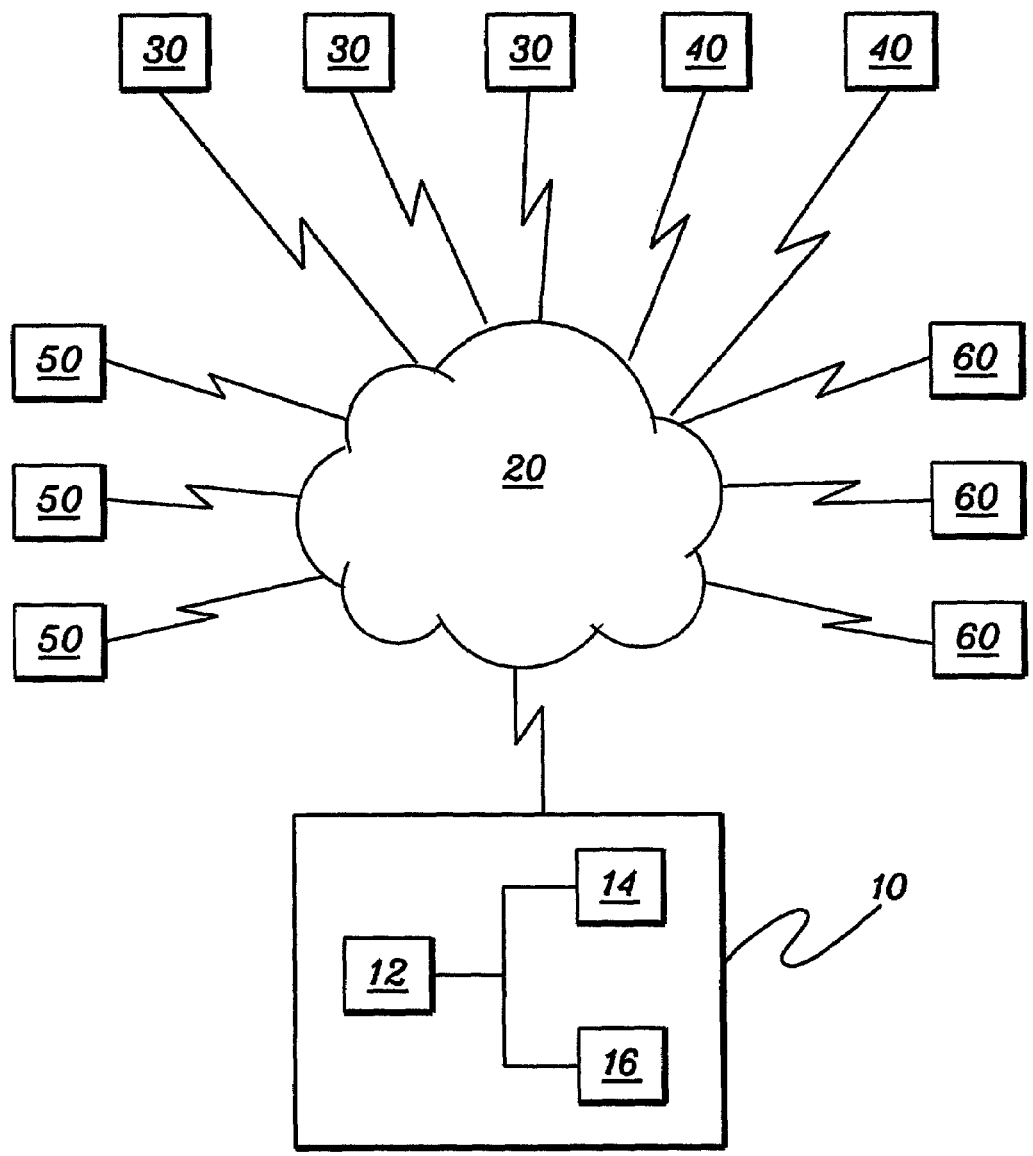
FIG. 1 is a block diagram of one embodiment of a floral network system for use in processing a plurality of floral arrangements for customers in accordance with the present invention.

FIG. 1 is a block diagram of one embodiment of floral network system 10 in accordance with the present invention, which may be operated by a business enterprise, for processing a plurality of orders for flower arrangements. As shown in FIG. 1, generally floral network system 10 may be connected to a communication network 20 such as a telephone network, a global network such as the Internet, or other network for communication with a plurality of florists 30, a plurality of floral wire service providers 40 such as the FTD wire service, and/or a plurality of online customers 50.

In addition, floral network system 10 may be operated by, for example, a supermarket distributor and connected via communication network 20 such as the Internet or its own computer network to a plurality of floral departments 60 in its supermarkets. It will also be appreciated that the present invention may also be a stand-alone floral system that is operated by a single independent florist or a single floral department of a store.

Floral network system 10 may include, for example, a computing unit or processor 12, one or more data storage units 14, and one or more input/output devices 16. The florists, floral departments, and online customers may access the network using personal computers, and the wire services may access the network using servers or personal computers. It will be appreciated that terminals, personal digital assistants, and other devices may be suitably employed.

Figure 2:
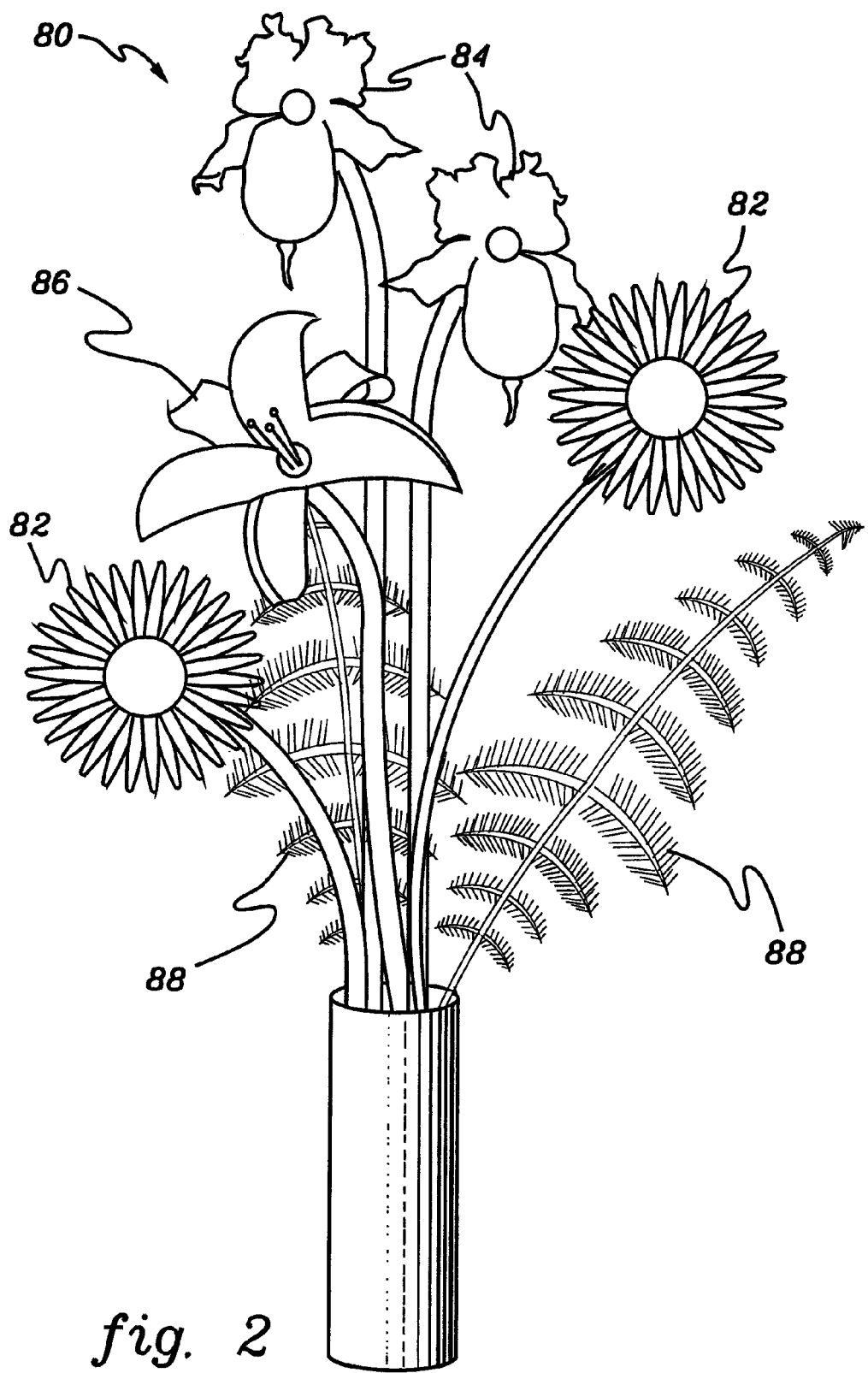
FIG. 2 is a close-up or detailed image of a floral arrangement for use in the floral network system of FIG. 1.

Whenever a new customer orders a floral arrangement, e.g. based on a catalog of floral arrangements or resulting from discussion between the customer and a florist, a registration screen may be displayed to the florist. The florist may then fill in the information for the customer and the order so that a custom personal database for the customer may be created. When a floral arrangement is made for a customer, for example, at a florist or at a floral department of a supermarket, one or more detailed or close-up images 80 of the floral arrangement may be taken such as illustrated in FIG. 2. For example, a detailed or close-up image may be taken using a digital camera, and transferred to and stored in data storage unit 14 under an order number, the customer's name, and/or other indicia. The detailed or close-up image may be an image taken at close range resulting in a tightly framed image and which may be shown at a relatively large scale allowing viewing of the flowers forming the floral arrangement. One or more close-up or detailed images may be taken, for example, a perspective view, a front elevational view, right and left elevational views, rear elevational view, or any other views which aid in illustrating the number of and type of flowers, the placement, and the container or vase for holding the floral arrangement. The one or more images may also aid the florist in constructing a similar floral arrangement using wire, foam, ribbons, bows, greens, and other design materials. Recipient information, retail price, particulars of the occasion and other information may also be obtained, and stored and linked to the one or more images. The floral arrangement may then be picked up or delivered to the recipient. Images of the floral arrangements may be sent to the customer so that at a later time, the customer may remember and/or share with others the floral arrangement that was sent. The storage of the images may be along with and associated with data describing the floral arrangement such as the order number, the number of and type of flowers in the floral arrangement, the customer name and address, recipient name and address, and the occasion for the floral arrangement. Additional information may include instructions for constructing the floral arrangement such as the materials used in the floral arrangement such as the type of container or vase, wire, foam, greens, ribbons, bows, and any other design material and information.

The next time that the customer orders a floral arrangement, the florist or a person in the floral department can retrieve the one or more detailed or close-up images and information on past personalized floral arrangement orders for the customer. In addition, online customers may access their own personalized accounts via the Internet, for example, by using a password. The close-up images and information may be presented to the customer for their review. This may speed up the service in taking and processing a new order, allow further customizing of the floral arrangement, and minimize the likelihood of errors and miscommunication in obtaining and processing the order for a floral arrangement.

Reminders may also be sent to the customers for important events where floral arrangements may be needed. Reminders may be sent via mail, telephone, or email. Orders may be taken, for example, by telephone, e-mail, or over the Internet.

Figure 3:
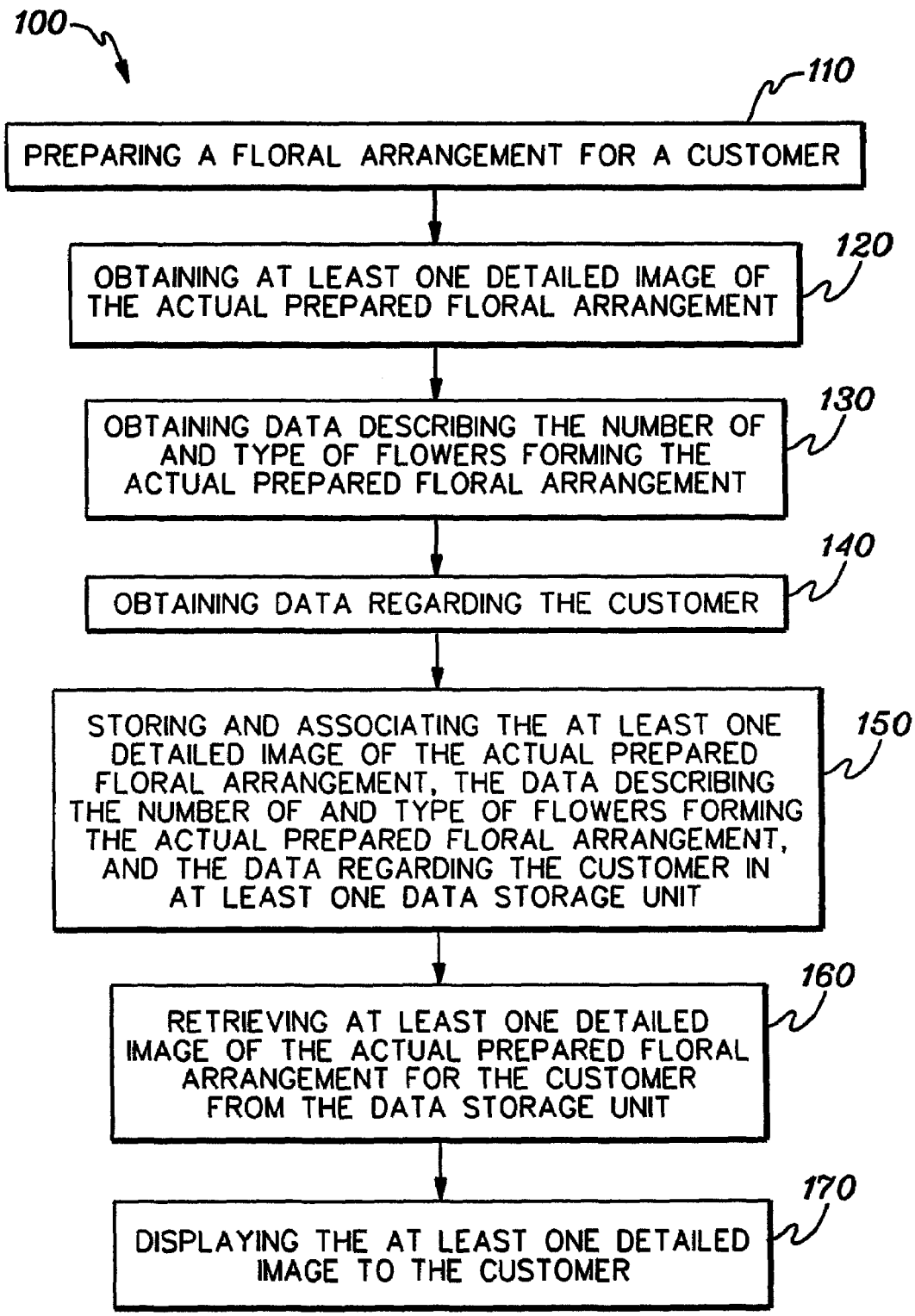
FIG. 3 is a flowchart of one embodiment of method for processing a plurality of floral arrangements for a customer using the floral network system of FIG. 1.

FIG. 3 illustrates a flowchart of one embodiment of a method 100 for processing an order for a flower arrangement for a customer in accordance with the present invention. Method 100 includes at 110, preparing a floral arrangement for the customer based on the order. At 120, at least one detailed or close-up image of the actual prepared floral arrangement is obtained, at 130 data describing the number of and type of flowers forming the actual prepared floral arrangement is obtained, and at 140 data regarding the customer is obtained. At 150, the at least one close-up image of the actual prepared floral arrangement, the data describing the number and type of flowers forming the actual prepared floral arrangement, and the data regarding the customer are stored and associated in at least one data storage unit for the customer. In addition to the image of the floral arrangement, the data stored in the data storage unit may also include the name and address of the customer, and the name and address of a recipient of the actual prepared floral arrangement, and/or instructions for constructing the floral arrangement. Thereafter, at 160, the at least one stored detailed image may be retrieved from the data storage unit, and at 170 the detailed image displayed, on a display or printed out, to the customer for use in purchasing another floral arrangement. It is appreciated that the displayed detailed image may be displayed at a lower resolution for the customer while the florist has access to a higher resolution of the detailed image and the data regarding the floral arrangement when preparing a similar floral arrangement.

For example, with reference again to FIG. 2, floral arrangement 80 may include two daisies 82, two irises 84, a lily 86, and two ferns 88. Thus, the data describing the number of and type of flowers forming the actual prepared floral arrangement may include listing two daisies, two irises, one lily, and two ferns. Such data may be stored in the data storage unit. In addition, the colors of the various flowers may be included as well as the particular variety of the type of flower.

As described above, customers of floral arrangements may access a floral system employing method 100, for example, at a florist, a floral department of a store, or via the Internet. At a later date, the customers may access their own designs. For example, one or more stored images of the actual prepared floral arrangement for a customer may be retrieved from the at least one data storage unit, and displayed for the customer on a display for the customer for use in purchasing another floral arrangement. Thereafter, subsequent floral arrangements may be prepared based on the at least one stored image of the actual prepared floral arrangement and the data describing the actual prepared floral arrangement. For example, the customer may view their past purchases and indicate whether they want to duplicate the next order or incorporate changes. The retrieval and display of the images and data to a florist allow generally producing a duplicate, and possibly a nearly exact duplicate, of the prior floral arrangement for the customer.

In addition, data regarding an occasion for the actual prepared floral arrangement may be obtained from the customer and stored in the data storage unit. This provides floral network system 10 (FIG. 1) with the ability to remind customers in the future of occasions for floral arrangements. Such a floral network system may simplify and streamline the processing of orders from frequent customers. The floral network system may also provide a personalized, customer-driven interactive process, or an automated process, e.g., where a customer can simply click on a button labeled "do it just like last time."

Figure 4:
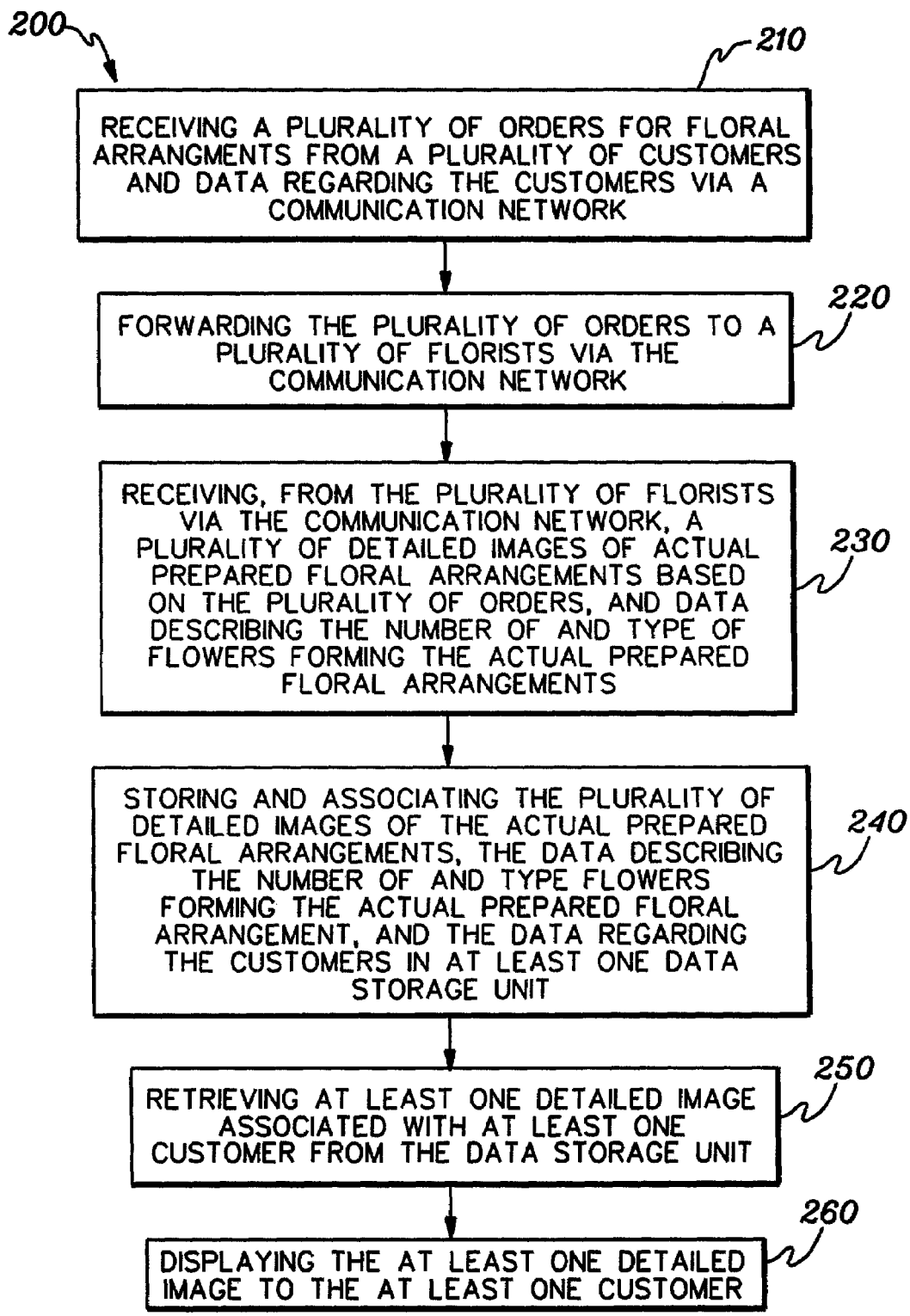
FIG. 4 is a flowchart of one embodiment of method for processing a plurality of floral arrangements for a plurality of customers using the floral network system of FIG. 1.

Another benefit of floral network system 10 is the ability to send orders and images from one location to another for processing floral arrangements. FIG. 4 illustrates a flowchart of one embodiment of a method 200 for processing a plurality of orders for delivery of flower arrangements. The orders may include data regarding the customer, the floral arrangement (and may include one or more images of an actual floral arrangement from an earlier purchase), the recipient, the price, the time for delivery, order number, and other information. Method 200 includes at 210, receiving a plurality of orders for floral arrangements from a plurality of customers via a communication network. At 220, the plurality of orders is forwarded to a plurality of florists via the communication network such as to florists located near a recipient for delivery of the floral arrangement. At 230, a plurality of close-up or detailed images of actual prepared floral arrangements based on the plurality of orders, and data describing the number of and type of flowers forming the actual prepared floral arrangement are received from the plurality of florists via the communication network. At 240, the plurality of close-up or detailed images of the actual prepared floral arrangements, the data describing the number of and type of flowers forming the actual prepared floral arrangement, and the data regarding the customer are stored and associated in at least one data storage unit. Additional data may include indicia identifying the orders, names and addresses of the customers, names and addresses of the recipients, dates and reasons for the purchase, and information on constructing the floral arrangement. Thereafter, at 250, the at least one stored detailed image may be retrieved from the data storage unit, and at 260 displayed to the customer for use in purchasing another floral arrangement. The at least one image and data regarding the image may be retrieved and displayed, e.g., on a display or printed out, for the florist in preparing another floral arrangement.

For example, the at least one stored close-up or detailed image of the actual prepared floral arrangement for a particular customer may be retrieved from the at least one data storage unit, and displayed on a display for the particular customer for use in purchasing a subsequent floral arrangement. Then, at the customer's direction, a florist may prepare another floral arrangement based on the at least one stored close-up or detailed image of the actual prepared floral arrangement and the data regarding the actual prepared floral arrangement for the particular customer.

Data regarding a plurality of occasions for the plurality of actual prepared floral arrangements in the at least one data storage unit may be stored and associated with the other data, and a plurality of reminders may be sent to the plurality of customers of the plurality of occasions for the floral arrangements. In another aspect of the floral network system, the system may compile a list for at least one of the plurality of stores of upcoming reminders for a plurality of customers, and forward the list to the at least one of the plurality of stores. The plurality of stores may then contact their local customers on the compiled list.

Conventionally, florists and floral department of stores use industry standard design catalogs for displaying floral arrangements to customers. Such design catalogs may not be seasonally appropriate and/or do not showcase individual talents. In another aspect of the floral system of the present invention, the floral system may include access to a database of updateable floral arrangement designs, e.g., a designer database, which may be displayed to the customer. This may result in a starting point for a custom or a personalized floral arrangement design for a customer. In addition, a database of updateable floral arrangement designs may be shared by various florists and floral departments. For example, each store on a floral network system may be able to access the designer database and learn new designs and techniques for floral arrangement. Using the database or updateable floral arrangement designs, florists can show selections to prospective customers that are current and seasonally appropriate. In addition, the operator of the floral network system may have a database of images of unique designs from which a customer may select. Florists and floral departments may also be provided with cost and retail pricing information, as well as view a recipe and directions for preparing the floral arrangement designs. The unique designs may be altered frequently and reflect the tastes of local clientele.

Particular unique actual floral arrangements created for customers using the floral network system in accordance with the present invention may be used in creating a database such as an electronic catalog for use by other customers in purchasing a floral arrangement.

For example, certain detailed or close-up images may be selected and compiled. One possibility may allow florists to nominate one or more best designs for use by other florists. Such lists may be compiled or posted periodically such as monthly or seasonally among, for example, a plurality of florists or floral departments operated by a supermarket. In addition, a compiled list or posting may be a gallery of designs and updated periodically such as monthly or seasonally.

Another way to access the floral system may be via in store kiosks. For example, a customer could enter their floral order upon entering a store such as a supermarket, conduct their shopping, and then pick up the completed or prepared floral arrangement at the end of their shopping. The customer may also access the Internet from the kiosk to send an order for a floral arrangement via a wire service to a distant recipient.

Some of the plurality of close-up or detailed images of the actual prepared floral arrangements may be forwarded, for example via email, to some of the plurality of customers prior to delivery of the actual prepared floral arrangement. Approval from the customer may be requested upon their viewing the close-up or detailed images of the actual prepared floral arrangements. In addition, if certain flowers are not available, the florist may transmit a close-up or detailed image of a substitute floral arrangement directly to the customer or to the network system which forwards the close-up or detailed image of the substitute floral arrangement to the customer. Approval may be requested from the customer prior to filling the order. If approval is granted, the network system can forward the approval to the florist. Thereafter, the floral arrangement may be picked up or delivered.

The floral network system may also be configured for customers desiring flowers and floral arrangements for weddings. For example, a potential customer such as a bride may register for a free wedding consultation on the system, either via the Internet or a kiosk in a store. A bride may enter information about her wedding into the floral network system which may be associated with designs and pricing. Images of flowers showing their colors and of floral arrangements could be sent to the bride and distant relatives for approval and may also be ordered from other stores in a chain. An email photo of the event may be sent one year after the wedding as an anniversary reminder. The designer database described above may include a section on weddings, showing the most popular designs in local areas.

The data storage unit may be searchable so that searching for particular types of flowers may allow retrieval of floral arrangements containing those types of flowers.

Another aspect of the present invention includes a computerized method for processing a plurality of gifts such as gift baskets, cakes, deli platters, meat, seafood and produce, as well as other items or products.

Figure 5:
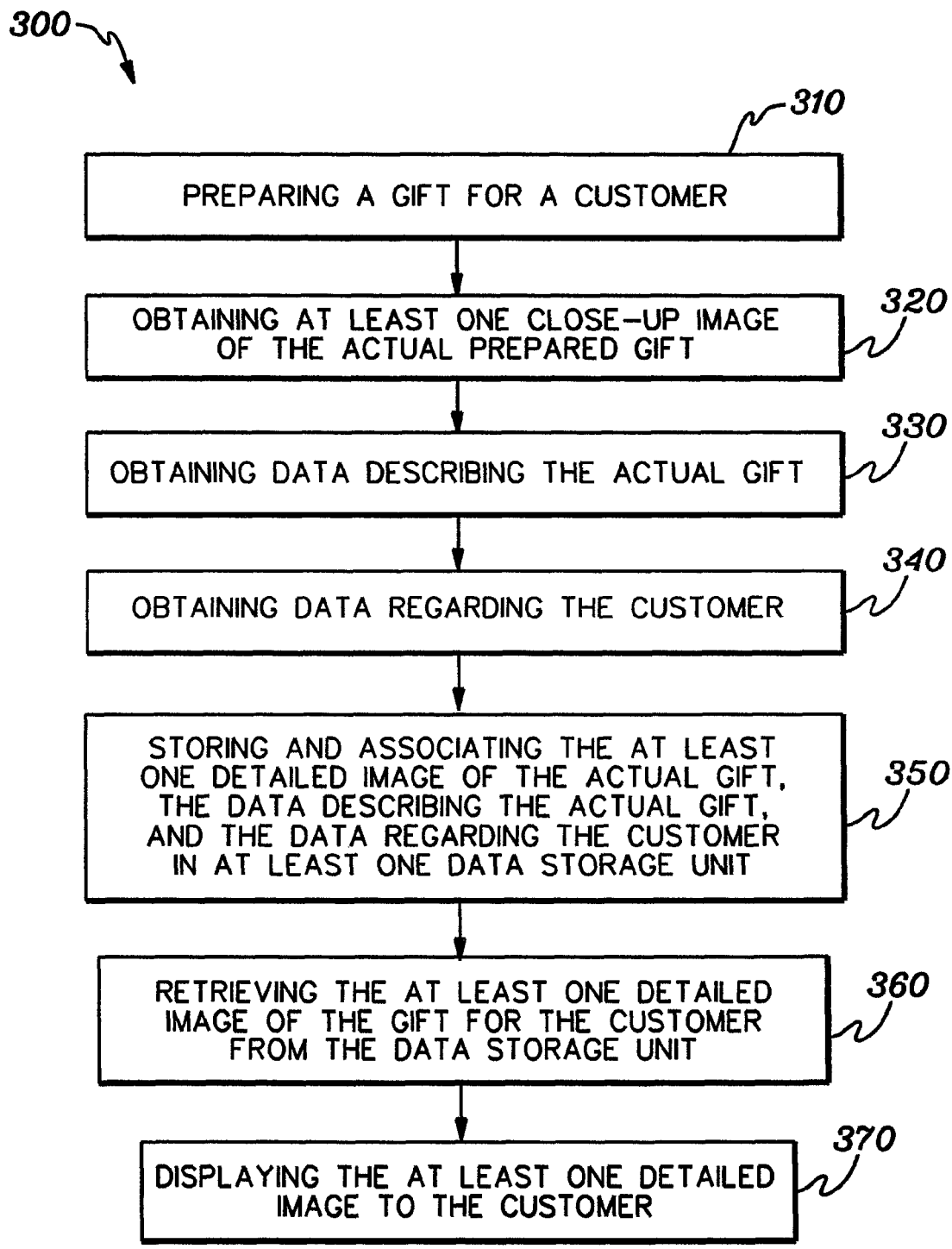
FIG. 5 is a flowchart of one embodiment of method for processing a gift for a customer using the network system of FIG. 1.

FIG. 5 illustrates a flowchart of one embodiment of a method 300 for processing an order for a gift for a customer. Method 300 includes at 310, preparing a gift for the customer based on the order. At 320, at least one close-up or detailed image of the actual prepared gift is obtained, at 330, data describing the actual gift is obtained, and at 340, data regarding the customer is obtained. At 350, the at least one close-up or detailed image of the actual prepared gift, the data describing the gift, and the data regarding the customer are stored and associated in at least one data storage unit. In addition to the close-up or detailed image of the gift, the data stored in the data storage unit may also include the name and address of the customer, and the name and address of a recipient of the gift. Thereafter, at 360, the at least one stored detailed image may be retrieved from the data storage unit, and at 370 displayed to the customer for use in purchasing another gift.

Figure 6:
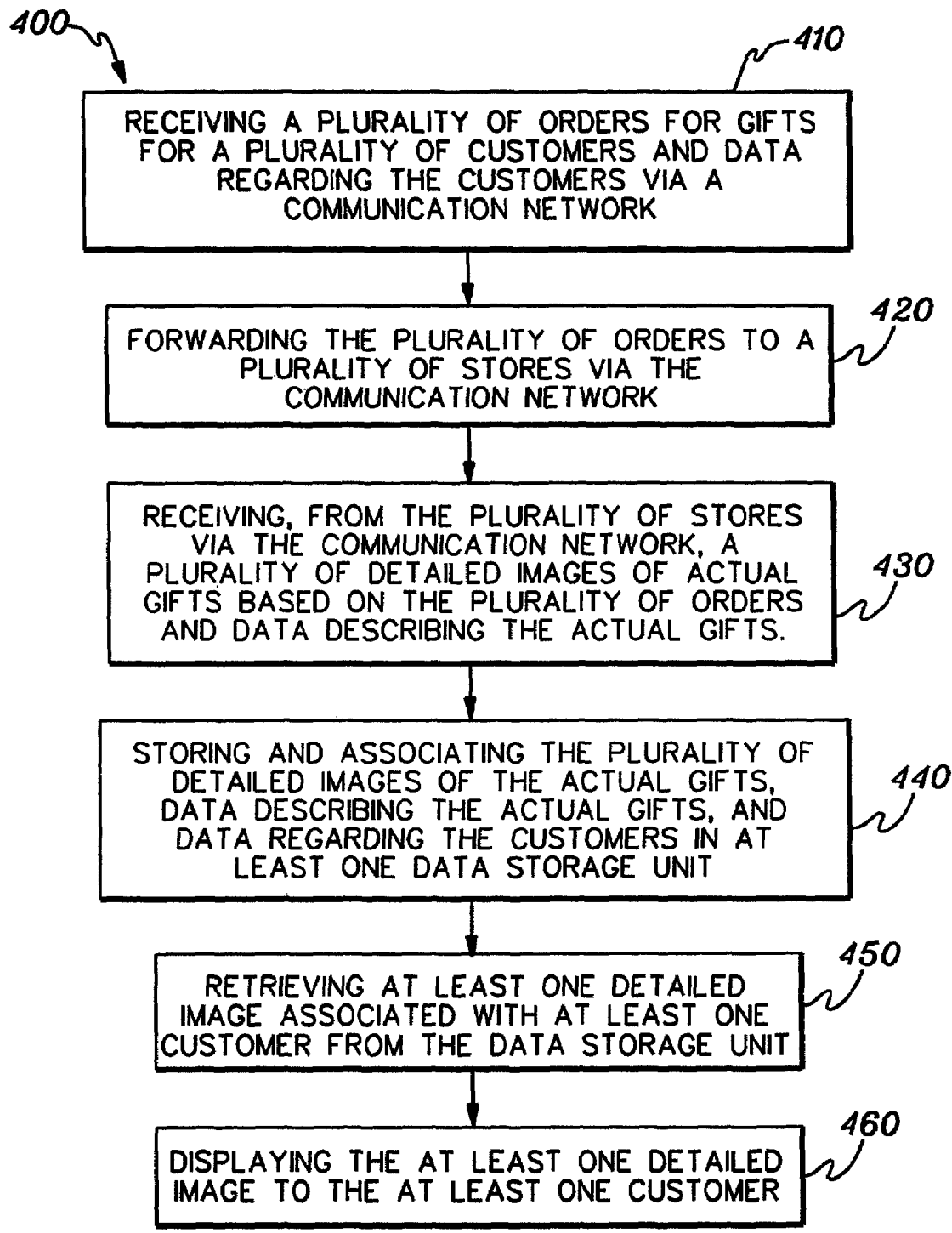
FIG. 6 is a flowchart of one embodiment of method for processing a plurality of gifts for a plurality of customers using the network system of FIG. 1.

FIG. 6 illustrates a flowchart of an embodiment of a method 400 for processing a plurality of orders for delivery of gifts. Method 400 includes at 410, receiving a plurality of orders for gifts from a plurality of customers via a communication network. At 420, the plurality of orders is forwarded to a plurality of stores via the communication network such as to stores located near a recipient for delivery of the gift. At 430, a plurality of close-up or detailed images of actual gift based on the plurality of orders, and data describing the gift are received from the plurality of stores via the communication network. At 440, the plurality of close-up or detailed images of the actual gift, data describing the gift, and the data regarding the customer are stored and associated in at least one data storage unit. Thereafter, at 450, the at least one stored detailed image may be retrieved via the communication from the data storage unit, and at 460 displayed to the customer for use in purchasing another gift. The detailed or close-up images and/ or data regarding the gift may be used in preparing a subsequent gift.

As described above, the network systems of the present invention may include, for example, one or more computing units, data storage units or memory, and one or more input/ output devices, as is well known in the art. The central computing unit may be based, for instance, on a Sun workstation running a Unix operating system, or a personal computer running a Microsoft WINDOWS operating system. The computing unit desirably includes or has access to memory or data storage units, e.g., hard drive(s), compact disk(s), tape drive (s), etc., for storing various data which are accessed and used in processing orders for floral arrangements.

As also described above, the communication network may include a local area network or a global communication network such as the Internet which comprises a vast number of computers and computer networks that are interconnected through communication links. The interconnected computers may exchange information using various services, such as electronic mail, and the World Wide Web ("WWW"). The WWW service allows receiving information or a web page from the floral network system.

Each resource (e.g., computer or Web page) of the WWW is uniquely identifiable by a Uniform Resource Locator ("URL"). To access information or view a specific Web page, for example, one computing unit specifies the URL for a second computing unit in a request (e.g., a HyperText Transfer Protocol ("HTTP") request). For example, the floral network system may be provided with a uniquely identifiable Uniform Resource Locator. When the computing units of the florist, floral department, or online customer receives the information, it typically displays the information in a Web page using a browser. A browser is a special-purpose application program that effects the requesting of Web pages and the displaying of Web pages. The computing units 620 may typically use a browser such as Microsoft's INTERNET EXPLORER.

More particularly, web pages are typically defined using HyperText Markup Language ("HTML"). HTML provides a standard set of tags that define how a Web page is to be displayed. When the requested HTML document is received by a computing unit, the browser displays the Web page as defined by the HTML document. The HTML document contains various tags that control the displaying of text, graphics, controls, and other features.

The above-described computing environments and/or computing units are only offered as examples. The present invention can be incorporated and used with many types of computing units, computers, processors, nodes, systems, workstations and/or environments without departing from the spirit of the present invention.

Although various embodiments have been depicted and described in detail herein, it will be apparent to those skilled in the relevant art that modifications, additions, substitutions and the like can be made without departing from the spirit of the present invention and these are, therefore, considered to be within the scope of the present invention as defined in the following claims.

The invention claimed is:

1. A computerized method for use in processing a plurality of floral arrangements for a customer, the computerized method comprising:

receiving at least one detailed image of an actual prepared floral arrangement made for the customer prior to delivery of the actual prepared floral arrangement to a recipient;

forwarding the at least one detailed image of the actual prepared floral arrangement to the customer along with a request for approval to send the actual prepared floral arrangement to the recipient;

receiving approval from the customer to send the actual prepared floral arrangement to the recipient prior to delivery of the actual prepared floral arrangement to the recipient;

receiving at least the number of the flowers and type of the flowers forming the actual prepared floral arrangement;

receiving data regarding the customer;

storing and associating the at least one detailed image of the actual prepared floral arrangement, the at least the number of the flowers and type of the flowers forming the actual prepared floral arrangement, and the data regarding the customer in at least one data storage unit;

retrieving the at least one stored detailed image of the actual prepared floral arrangement for the customer from the at least one data storage unit; and forwarding the at least one stored detailed image for display on a display for use by the customer in purchasing another floral arrangement.

2. The computerized method of claim 1 further comprising retrieving and forwarding the number of the flowers and type of flowers along with the display of the at least one stored detailed image for use in preparing another floral arrangement.

3. The computerized method of claim 1 wherein the storing and associating further comprises storing and associating data regarding materials and information on constructing the actual prepared floral arrangement for the customer.

4. The computerized method of claim 1 wherein the actual prepared floral arrangement comprises an actual prepared personalized floral arrangement.

5. The computerized method of claim 1 wherein the storing and associating further comprises storing and associating data regarding an occasion for the actual prepared floral arrangement in the at least one data storage unit, and further comprising reminding the customer of the occasion for the floral arrangement.

6. The computerized method of claim 1 further comprising accessing a database of floral arrangement designs selected from a plurality of actual prepared floral arrangements for a plurality of customers, and forwarding at least one detailed image from the database of floral arrangement designs to the customer for use in purchasing a floral arrangement.

7. The computerized method of claim 1 wherein the receiving at least one detailed image comprises receiving at least one detailed image for each of a plurality of actual prepared floral arrangements made for the customer prior to delivery of the plurality of actual prepared floral arrangement to a plurality of recipients, the storing and associating comprises storing and associating the at least one detailed image for each of the plurality of actual prepared floral arrangements in at least one data storage unit, the retrieving comprises retrieving at least some of the at least one stored detailed image of each of the plurality of actual prepared floral arrangements for the customer from the at least one data storage unit, and the forwarding comprises forwarding the at least some of the at least one stored detailed image of each of the plurality of actual prepared floral arrangements to the customer for use in purchasing another floral arrangement.

8. A system for use in processing a plurality of floral arrangements for a customer, the system comprising:
   a processor;
   at least one storage unit operably connected to said processor;
   said processor configured to receive at least one detailed image of an actual prepared floral arrangement made for a customer prior to delivery of the actual prepared floral arrangement to a recipient, at least the number of the flowers and type of the flowers forming the actual prepared floral arrangement, and data regarding the customer;
   said processor configured to forward the at least one detailed image of the actual prepared floral arrangement to the customer along with a request for approval to send the actual prepared floral arrangement to the recipient;
   said processor configured to receive approval from the customer to send the actual prepared floral arrangement to the recipient prior to delivery of the actual prepared floral arrangement to the recipient;
   said processor configured to store and associate the at least one detailed image of the actual prepared floral arrangement, the at least the number of the flowers and type of the flowers forming the actual prepared floral arrangement, and the data regarding the customer in the at least one storage unit;
   a display operably connected to the processor; and
   said processor configured to retrieve the at least one stored detailed image from the at least one data storage unit for display on the display for use by the customer in purchasing another floral arrangement.

9. The system of claim 7 wherein said processor is operable to retrieve for display the number of the flowers and type of flowers along with the display of the at least one stored detailed image for use in preparing another floral arrangement.

10. The system of claim 8 wherein said processor is operable to store and associate data regarding materials and information on constructing the actual prepared floral arrangement.

11. The system of claim 8 wherein the actual prepared floral arrangement comprises an actual prepared personalized floral arrangement.

12. The system of claim 8 wherein said processor is configured to receive data regarding an occasion for the actual prepared floral arrangement, and said processor configured to send a reminder to the customer of the occasion for the floral arrangement.

13. The system of claim 8 wherein said at least one data storage unit comprises a database of floral arrangement designs selected from a plurality of actual floral arrangements prepared for a plurality of customers, and further comprising displaying one of more detailed images from the floral arrangement designs on the display to the customer for use in purchasing a floral arrangement.

14. The system of claim 8 wherein said processor configured to receive at least one detailed image comprises said processor operable to receive at least one detailed image for each of a plurality of actual prepared floral arrangements made for the customer prior to delivery of the plurality of actual prepared floral arrangement to a plurality of recipients, said processor configured to store and associate comprises said processor operable to store and associate the at least one detailed image for each of the plurality of actual prepared floral arrangements in at least one data storage unit, said processor configured to retrieve comprises said processor configured to retrieve at least some of the at least one stored detailed image of each of the plurality of actual prepared floral arrangements for the customer from the at least one data storage unit, and said processor configured to display comprises said processor configured to display the some of the at least one stored detailed image on the display for the customer for use in purchasing another floral arrangement.

15. A computerized system for use in processing a plurality of floral arrangements for a customer, the computerized system comprising:
   means for receiving at least one detailed image of an actual prepared floral arrangement made for a customer prior to delivery of the actual prepared floral arrangement to a recipient;
   means for receiving at least the number of and type of the flowers forming the actual prepared floral arrangement;
   means for receiving data regarding the customer;
   means for forwarding the at least one detailed image of the actual prepared floral arrangement to the customer along with a request for approval to send the actual prepared floral arrangement to the recipient;
   means for receiving approval from the customer to send the actual prepared floral arrangement to the recipient prior to delivery of the actual prepared floral arrangement to the recipient;
   means for storing and associating the at least one detailed image of the actual prepared floral arrangement, the at least the number of the flowers and type of the flowers forming the actual prepared floral arrangement, and the data regarding the customer in at least one data storage unit;

means for retrieving the at least one stored detailed image from the means for storing; and means for forwarding the at least one retrieved detailed image for display and use by the customer in purchasing another floral arrangement.

16. The computerized system of claim 15 wherein the means for receiving at least one detailed image comprises means for receiving at least one detailed image for each of a plurality of actual prepared floral arrangements made for the customer prior to delivery of the plurality of actual prepared floral arrangement to a plurality of recipients, the means for storing and associating comprises means for storing and associating the at least one detailed image for each of the plurality of actual prepared floral arrangements in at least one data storage unit, the means for retrieving comprises means for retrieving at least some of the at least one stored detailed image of each of the plurality of actual prepared floral arrangements for the customer from the at least one data storage unit, and the means for forwarding comprises means for forwarding the at least some of the at least one stored detailed image of each of the plurality of actual prepared floral arrangements to the customer for use in purchasing another floral arrangement.

17. At least one program storage device readable by a machine, tangibly embodying at least one program of instructions executable by the machine to perform a method for use in processing a plurality of floral arrangements for a customer, the method comprising:

receiving at least one detailed image of the actual prepared floral arrangement made for the customer prior to delivery of the actual prepared floral arrangement to a recipient;

receiving at least the number of the flowers and type of the flowers forming the actual prepared floral arrangement;

receiving data regarding the customer;

forwarding the at least one detailed image of the actual prepared floral arrangement to the customer along with a request for approval to send the actual prepared floral arrangement to the recipient;

receiving approval from the customer to send the actual prepared floral arrangement to the recipient prior to delivery of the actual prepared floral arrangement to the recipient;

storing and associating the at least one detailed image of the actual prepared floral arrangement, the at least the number of the flowers and type of the flowers forming the actual prepared floral arrangement, and the data regarding the customer in at least one data storage unit; and forwarding the at least one stored detailed image for display and use by the customer in purchasing another floral arrangement.

18. The at least one program storage device of claim 17 wherein the receiving at least one detailed image comprises receiving at least one detailed image for each of a plurality of actual prepared floral arrangements made for the customer prior to delivery of the plurality of actual prepared floral arrangement to a plurality of recipients, the storing and associating comprises storing and associating the at least one detailed image for each of the plurality of actual prepared floral arrangements in at least one data storage unit, the retrieving comprises retrieving at least some of the at least one stored detailed image of each of the plurality of actual prepared floral arrangements for the customer from the at least one data storage unit, and the forwarding comprises forwarding the at least some of the at least one stored detailed image of each of the plurality of actual prepared floral arrangements to the customer for use in purchasing another floral arrangement.

19. A computerized method for use in processing a plurality of floral arrangements for a plurality of customers, the method comprising:

receiving a plurality of orders for floral arrangements for the plurality of customers via a communication network;

forwarding the plurality of orders to a plurality of florists via the communication network;

receiving, from the plurality of florists via the communication network, a plurality of detailed images of actual prepared floral arrangements based on the plurality of orders, and the number of the flowers and type of flowers forming the actual prepared floral arrangements;

forwarding some of the plurality of detailed images of actual prepared floral arrangements to some of the plurality of customers along with a request for approval to send the actual prepared floral arrangements to the recipient;

receiving approvals from some of the plurality of customers to send the actual prepared floral arrangement to the recipient prior to delivery of the actual prepared floral arrangement to the recipient;

storing and associating the plurality of detailed images of the actual prepared floral arrangements, the number of the flowers and type of flowers forming the actual prepared floral arrangements, and the data regarding the plurality of customers in at least one data storage unit;

retrieving at least one stored detailed image of the actual prepared floral arrangement associated with at least one customer from the at least one data storage unit via the communication network; and forwarding the at least one stored detailed image for the at least one customer for use in purchasing another floral arrangement.

20. The computerized method of claim 19 further comprising retrieving via the communication network the number of the flowers and type of flowers associated with the at least one stored detailed image and the at least one stored detailed image, and forwarding the number of and type of flowers and the at least one stored detailed image for use in preparing another floral arrangement.

21. The computerized method of claim 19 wherein the storing and associating further comprises storing and associating data regarding materials and information on constructing the plurality of actual prepared floral arrangements.

22. The computerized method of claim 19 wherein the actual prepared floral arrangements comprises a plurality of actual prepared personalized floral arrangements.

23. The computerized method of claim 19 wherein the storing and associating further comprises storing and associating data regarding a plurality of occasions for the plurality of actual prepared floral arrangements in the at least one data storage unit, and further comprising reminding the plurality of customers of the plurality of occasions for the floral arrangements.

24. The computerized method of claim 19 wherein the storing and associating further comprises storing and associating data regarding a plurality of occasions for the plurality of actual prepared floral arrangements in the at least one data storage unit, and further comprising compiling a list for at least one of the plurality of florists of upcoming reminders for a plurality of customers for the at least one of the plurality of florists, and forwarding the list to the at least one of the plurality of florists.

25. The computerized method of claim 19 further comprising accessing a database of floral arrangement designs selected from a plurality of actual prepared floral arrangements for a plurality of customers, and forwarding at least one detailed image from the floral arrangement designs to the customer for use in purchasing a floral arrangement.

26. The computerized method of claim 19 further comprising forwarding the approvals to the plurality of florists for delivery of the plurality of some of prepared arrangements.

27. The computerized method of claim 19 further comprising receiving a plurality of detailed images of prepared substitute floral arrangements from some of the plurality of florists having changes from the number of the flowers and type of flowers based on the order for the plurality of floral arrangements, forwarding the plurality of detailed images of the prepared substitute floral arrangements to some of the plurality of customers, receiving approval from some of the plurality of customers upon their viewing the plurality of detailed images of the prepared substitute floral arrangements, and forwarding approval to some of the plurality of florists for delivery of the plurality of substitute floral arrangements.

28. The computerized method of claim 19 wherein the receiving the plurality of orders comprises receiving some of the plurality of orders from a floral wire service.

29. The computerized method of claim 19 wherein the communication network comprises a global communication network.

30. The computerized method of claim 19 wherein the receiving the plurality of orders comprises receiving some of the plurality of orders from a plurality of florists.

31. A system for processing a plurality of floral arrangements for a plurality of customers, the system comprising:
a processor;
at least one storage unit operably connected to said processor;
a display operably connected to the processor;
said processor configured to receive a plurality of orders for floral arrangements for the plurality of customers via a communication network, to forward the plurality of orders to a plurality of florists via the communication network, to receive from the plurality of florists via the communication network a plurality of detailed images of actual prepared floral arrangements based on the plurality of orders, the number of the flowers and type of flowers forming the actual prepared floral arrangements, and data regarding the customers, to forward some of the plurality of detailed images of actual prepared floral arrangements to some of the plurality of customers along with a request for approval to send the actual prepared floral arrangements to the recipient, to receive approvals from some of the plurality of customers to send the actual prepared floral arrangement to the recipient prior to delivery of the actual prepared floral arrangement to the recipient, to store and associate the plurality of detailed images of the actual prepared floral arrangements in a data storage unit, the number of the flowers and type of flowers forming the actual prepared floral arrangements, and the data regarding the customers in at least one data storage unit, to retrieve at least one stored detailed image of the actual prepared floral arrangement associated with at least one customer from the at least one data storage unit via the communication network, and to display the at least one stored detailed image on the display for the at least one customer for use in purchasing another floral arrangement.

32. The system of claim 31 wherein said processor is configured to store and associate data regarding a plurality of occasions for the plurality of actual prepared floral arrangements in the at least one data storage unit, and further comprising compiling a list for at least one of the plurality of florists of upcoming reminders for a plurality of customers for the at least one of the plurality of florists, and forwarding the list to the at least one of the plurality of florists.

33. The system of claim 31 wherein said processor is configured to access at least one data storage unit comprising a database of floral arrangement designs selected from a plurality of actual floral arrangements prepared for a plurality of customers, and further configured to display at least one detailed images from the floral arrangement designs on the display to the customer for use in purchasing a floral arrangement.

34. A computerized system for use in processing a plurality of floral arrangements for a plurality of customers, the system comprising:
means for receiving a plurality of orders for floral arrangements for the plurality of customers via a communication network;
means for forwarding the plurality of orders to a plurality of florists via the communication network;
means for receiving, from the plurality of florists via the communication network, a plurality of detailed images of actual prepared floral arrangements based on the plurality of orders, and the number of the flowers and type of flowers forming the actual prepared floral arrangements;
means for forwarding some of the plurality of detailed images of actual prepared floral arrangements to some of the plurality of customers along with a request for approval to send the actual prepared floral arrangement to the recipient;
means for receiving approvals from some of the plurality of customers to send the actual prepared floral arrangement to the recipient prior to delivery of the actual prepared floral arrangement to the recipient;
means for storing and associating the plurality of detailed images of the actual prepared floral arrangements, the number of the flowers and type of flowers forming the actual prepared floral arrangements, and the data regarding the plurality of customers in at least one data storage unit;
means for retrieving at least one stored detailed image of the actual prepared floral arrangement associated with at least one customer from the at least one data storage unit via the communication network; and
means for forwarding the at least one stored detailed image for display on a display for use by the at least one customer in purchasing another floral arrangement.

35. At least one program storage device readable by a machine, tangibly embodying at least one program of instructions executable by the machine to perform a method for use in processing a plurality of floral arrangements for a customer, the method comprising:
receiving a plurality of orders for floral arrangements for the plurality of customers via a communication network;
forwarding the plurality of orders to a plurality of florists via the communication network;
receiving, from the plurality of florists via the communication network, a plurality of detailed images of actual prepared floral arrangements based on the plurality of orders, and the number of the flowers and type of flowers forming the actual prepared floral arrangements;

forwarding some of the plurality of detailed images of actual prepared floral arrangements to some of the plurality of customers along with a request for approval to send the actual prepared floral arrangement to the recipient;

receiving approvals from some of the plurality of customers to send the actual prepared floral arrangement to the recipient prior to delivery of the actual prepared floral arrangement to the recipient;

storing and associating the plurality of detailed images of the actual prepared floral arrangements, the number of the flowers and type of flowers forming the actual prepared floral arrangements, and the data regarding the plurality of customers in at least one data storage unit;

retrieving at least one stored detailed image of the actual prepared floral arrangement associated with at least one customer from the at least one data storage unit via the communication network; and forwarding the at least one stored detailed image for display on a display for use by the at least one customer in purchasing another floral arrangement.

* * * * *

UNITED STATES PATENT AND TRADEMARK OFFICE
CERTIFICATE OF CORRECTION

| | | |
|---|---|---|
| PATENT NO. | : 7,835,948 B2 | Page 1 of 1 |
| APPLICATION NO. | : 11/470778 | |
| DATED | : November 16, 2010 | |
| INVENTOR(S) | : Golub et al. | |

It is certified that error appears in the above-identified patent and that said Letters Patent is hereby corrected as shown below:

Claim 9, at Column 12, Line 5: Delete "claim 7" and insert --claim 8--

Claim 9, at Column 12, Line 5: Delete "operable" and insert --configured--

Claim 14, at Column 12, Line 31: Delete "operable" and insert --configured--

Claim 14, at Column 12, Line 36: Delete "operable" and insert --configured--

Claim 15, at Column 12, Line 54: after "number of" insert --the flowers--

Signed and Sealed this
Twenty-fifth Day of January, 2011

David J. Kappos
*Director of the United States Patent and Trademark Office*